United States Patent [19]

Mima

[11] Patent Number: 5,245,816
[45] Date of Patent: Sep. 21, 1993

[54] ANTIROTATION DEVICE FOR TRAY

[75] Inventor: Hiroshi Mima, Joyo, Japan

[73] Assignee: Murata Kikai Kabushiki Kaisha, Kyoto, Japan

[21] Appl. No.: 924,592

[22] Filed: Jul. 22, 1992

Related U.S. Application Data

[63] Continuation of Ser. No. 699,762, May 14, 1991, abandoned.

[30] Foreign Application Priority Data

May 16, 1990 [JP] Japan .................... 2-50287

[51] Int. Cl.$^5$ .................... D01H 9/14; B65G 47/84
[52] U.S. Cl. .................... 57/281; 57/90; 198/465.1; 242/35.5 A
[58] Field of Search .................... 57/90, 281; 198/465.1, 198/803.01, 487.1, 803.12; 242/35.5 A

[56] References Cited

U.S. PATENT DOCUMENTS

| | | | |
|---|---|---|---|
| 4,513,854 | 4/1985 | Prodel et al. | 198/465.1 |
| 4,530,287 | 7/1985 | Sticht | 198/465.1 X |
| 4,742,967 | 5/1988 | Sanno et al. | 242/35.5 A |
| 4,747,482 | 5/1988 | Sanno | 242/35.5 A X |
| 4,848,077 | 7/1989 | Kawarabashi et al. | 57/281 |
| 4,899,865 | 2/1990 | Keil | 198/465.1 X |

FOREIGN PATENT DOCUMENTS 353964  6/1991  Japan .

Primary Examiner—Daniel P. Stodola
Assistant Examiner—William Stryjewski
Attorney, Agent, or Firm—Spensley Horn Jubas and Lubitz

[57] ABSTRACT

In a tray conveying device comprising a guide groove for guiding both sides in a carrying direction of a disk-like tray with a yarn feed package stood upright and a drive belt for supporting a bottom of the tray to carry it along the guide groove, a roller which is guided by an upper end edge of the guide groove is provided at a position away from the center of the upper surface of the tray.

12 Claims, 2 Drawing Sheets

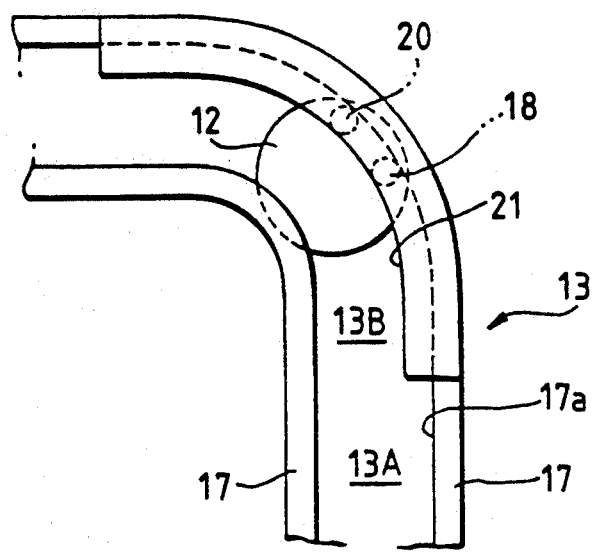
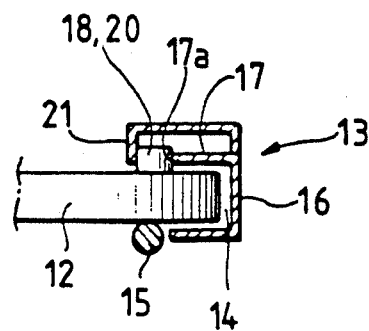
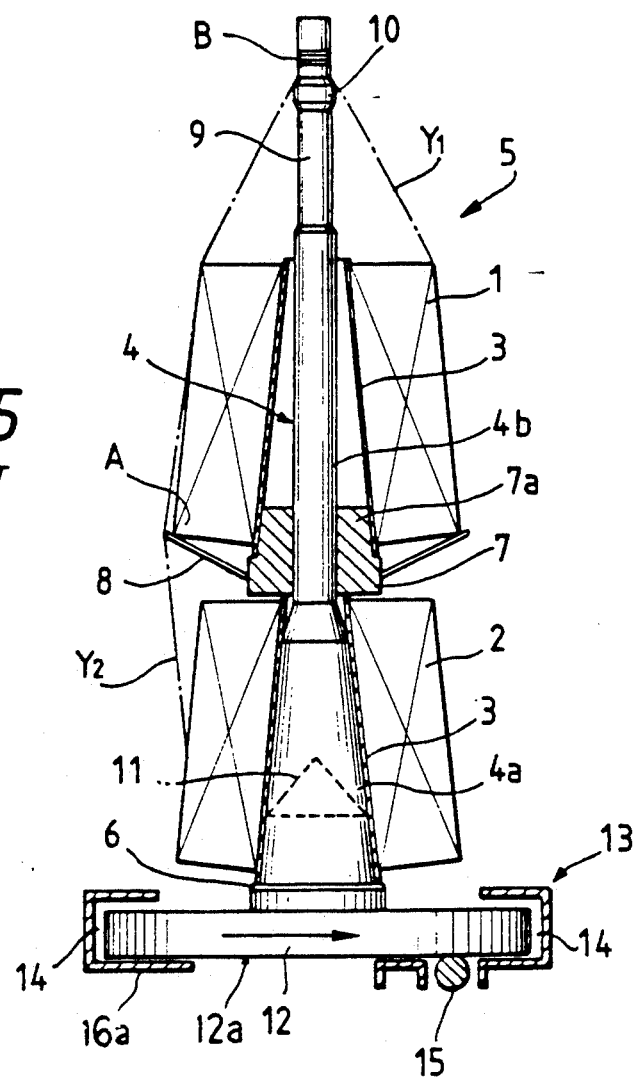

ANTIROTATION DEVICE FOR TRAY

This is a continuation of application Ser. No. 07/699,762 filed on May 14, 1991, now abandoned.

FIELD OF THE INVENTION

The present invention relates to an antirotation device for a tray in a tray conveying device for conveying a tray carrying with a yarn feed package placed thereon.

RELATED ART STATEMENT

In a two-for-one twister or the like, a tray conveying device is used for the purpose of supplying a yarn feed package to each of its units. This tray conveying device includes the case for carrying a single yarn feed package with two ply yarns wound and the case for carrying a so-called two-stage type yarn feed package in which a yarn feed package with single yarns wound is overlaid in two stages.

FIG. 5 shows the case for carrying a two-stage yarn feed package (Japanese Utility Model Application No. 116055/1989) previously filed by the present applicant. In FIG. 5, reference numerals 1 and 2 designate single yarn packages which are wound about a take-up tube 3. These packages 1 and 2 are fitted in the outer periphery of a cylindrical adapter 4 in upper and lower stages to constitute a two-stage type yarn feed package 5. The adapter 4 has a portion 4a, at which the lower stage package 2 is positioned, formed into a conical configuration along the inner shaper of a truncafed conical take-up tube 3, and a portion 4b, at which the upper package 1 is positioned, formed into a cylindrical shape. The adapter 4 is formed at its lower end with a flange 6 for stopping the lower end of the take-up tube 3 of the package 2. A spacer 7 having a fitting portion 7a, in which the lower portion of the take-up tube 3 of the upper stage package 1 is fitted, is loosely fitted in the outer periphery of the adapter 4 between the upper and lower packages 1 and 2. A defining member (in which a resin fine wire is mounted in a flange-like manner) 8 for defining a yarn Y2 released from the lower stage package 2 such that the yarn Y2 does not contact with a lower edge A of a yarn layer of the upper stage package 1 is mounted on the spacer 7.

The adapter 4 is integrally formed in the upper end with a cylindrical top cap 9 for inserting and guiding the yarns Y1 and Y2 released from both the packages, 1 and 2 into an adapter 4 through an axial hole. Both yarn ends are subjected to yarn end finding from the surfaces of the yarn layers of both of the packages 1 and 2 and are wound around the upper end of the top cap 9. The top cap 9 is formed with an annular inflated portion 10 to prevent a wound portion B of the yarn end from being loosened and disengaged.

In order to carry the thus structured two-stage type yarn feed package (clip cone) 5, a disk-like tray 12 with a peg 11 projected to make the package 5 stand up and a tray conveying device 13 for carrying the tray 12 are used in the central portion of the upper surface thereof. The tray conveying device 13 is principally composed of a guide groove 14 for guiding both sides in a carrying direction of the tray 12 and a drive belt 15 for carrying the tray 12 along the guide groove 14 supporting a bottom of tray 12. In this case, a round belt is used as the drive belt 15 in order to allow the belt to continuously pass drive belt along the guide groove having a straight line portion and a curved line portion, and the drive belt 15 is arranged so as to support the tray from a position deviated from the center of the tray bottom.

The bottom face 12a of the tray 12 is supported by the bottom frame 16a and the drive belt 15, and the tray 12 is transferred by the drive belt 15. If the drive belt is extended below the center portion of the tray, the rotation of the tray may be prevented but the edge portion of the tray is easily moved up or down. So, the drive belt 15 is arranged at a position deviated from the center of the bottom face 12a of the tray 12.

However, in the aforesaid tray conveyor 13, an axial rotational moment occurs in the tray 12 because of the presence of the drive belt 15 at a position deviated from the center. A rotation as indicated by the arrow shown in FIG. 5, therefore, occurs during carrying. Particularly, in the case of the two-stage type yarn feed package 5, a deviation of rotation occurs between the tray 12 and the adapter 4 or between the upper and lower packages 1 and 2 due to a difference in vibration and friction coefficient, resulting in problems such as the yarn end wound about the top cap 9 being broken or disengaged, or the yarn end Y2 of the lower-stage yarn feed package 2 becoming wound between the upper and lower packages 1 and 2 and breaking so that it cannot be released.

OBJECT AND SUMMARY OF THE INVENTION

It is therefore an object of the present invention to provide an antirotation device for a tray which can prevent rotation of the tray during carrying and can overcome inconveniences such as yarn breakages occurring during the carriage of the two-stage yarn feed package.

For achieving the aforesaid object, the present invention provides, in a tray conveying device having a guide groove for guiding both sides of a disk-like tray with a yarn feed package stood upright thereon in a carrying direction and a drive belt for supporting a bottom of the tray to carry it along the guide groove, an arrangement wherein a roller for guiding along an upper end edge of said guide groove is provided at a position away from the center of the upper surface of the tray.

The tray carried by the drive belt along the guide groove is subjected to a rotational moment by the drive belt. However, the roller provided on the tray comes into contact with the upper end edge of the guide groove to thereby eliminate the rotational moment whereby the rotation of the tray is impeded. Accordingly, inconveniences such as yarn breakages produced during the carrying of the two-stage type yarn feed package is overcome.

BRIEF DESCRIPTION OF THE DRAWINGS

FIG. 3 is a plan view of a curved carrying path of the device;

FIG. 4 is a fragmentary sectional view of FIG. 3; and

FIG. 5 is a sectional view showing a conventional tray.

DETAILED DESCRIPTION OF PREFERRED EMBODIMENT

One embodiment of the present invention will be described hereinafter with reference to the accompanying drawings.

Figure 1:
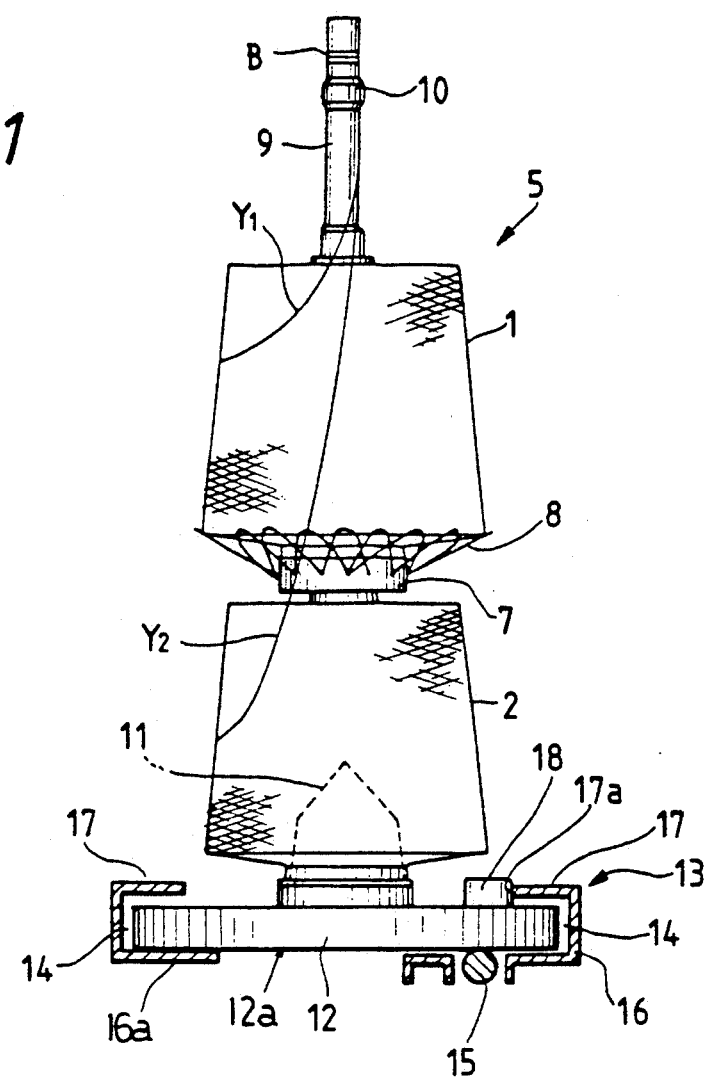
FIG. 1 is a sectional view showing one embodiment of an antirotation device for a tray according to the present invention.
Figure 2:
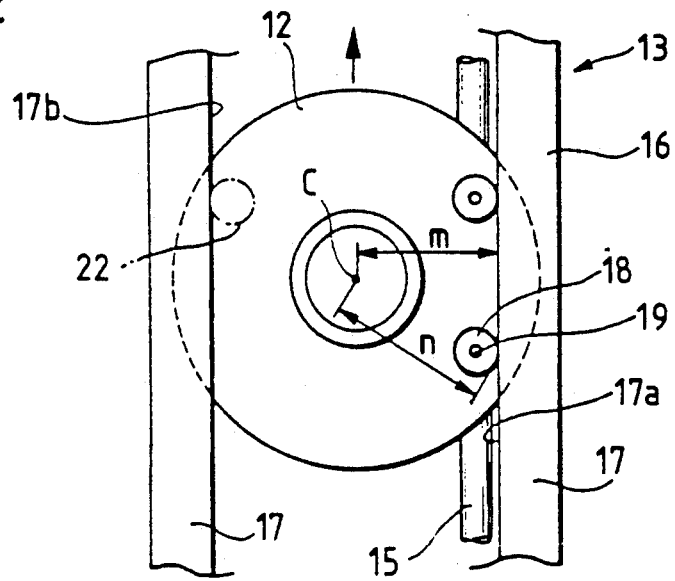
FIG. 2 is a plan view of the device.

In FIGS. 1 and 2, reference numeral 12 designates a disk-like tray, in the central portion of the upper surface of which is projected a peg 11 for supporting a yarn feed package in an upright state. In this embodiment, a two-stage type yarn feed package 5 is used as a yarn feed package. The same parts as those shown in FIG. 5 are indicated by the same reference numerals, description of which are omitted.

A tray conveying device 13 for carrying the tray 12 is provided with a frame 16 formed with a pair of opposed guide grooves 14 for guiding both sides in a carrying direction of the tray 12. The tray 12 is prevented from being tipped over by an upper flange 17 of the frame 16.

A round drive belt 15 for carrying the tray 12 while supporting the bottom thereof is extended along a guide groove 14 in the state where the belt 15 is closer to one of the guide grooves 14 than the other (on the right hand in the FIG. 1).

As a device for preventing rotation of the tray 12 being carried, a roller 18 (called also a first roller) which moves along an upper end edge of the guide groove 14, i.e., an end edge 17a of the upper flange 17, is rotatably mounted by a pin 19 at a position deviated from the center C on the upper surface of the tray 12. A projection may be provided instead of the roller 18. However, a roller is necessary in order to reduce friction with the end edge 17a of the upper flange 17 to secure smooth movement of the tray 12. Furthermore, in order to impede the rotation of the tray 12, it is necessary that roller 18 be mounted a distance n from the center C such that is n>m, where m represents the distance from the center C of the tray 12 to the end edge 17a of the upper flange 17.

One roller will suffice to impede the rotation of the tray 12. However, in case of one roller, when the tray 12 moves from a straight line portion 13A to a curve portion 13B on the conveying device 13, it is subjected to shock depending upon the direction of the tray 12, as shown in FIG. 3. In order to overcome this, in this embodiment, a second roller 20 with the end edge 17a of the upper flange 17 as a guide is provided ahead in a carrying direction of the first roller 18. A guide member 21 is provided on the curve portion 13B parallel with the end edge 17a so as to define a passage for both rollers, 18 and 20 between the end edge 17a of the upper flange 17 and guide member 21, as shown in FIGS. 3 and 4. The addition of the second roller 20 causes the direction of the tray 12 to change to the advancing direction before the first roller 18 moves from the straight line portion 13A to the curve portion 13B, thereby relieving the shock applied to the first roller 18.

The operation of the embodiment will be described hereinafter.

The tray 12, both sides of which are engaged with the guide groove 14, is carried along the guide groove 14 as the drive belt 15 travels since the bottom thereof is in contact with the drive belt 15 and moves with the two-stage type yarn feed package 5 placed thereon. The axial rotational moment occurs in the tray 12 due to the presence of the drive belt 15 during carrying. However, since the first roller 18 provided on the tray 12 is in contact with the upper end edge 17a of the guide groove 14, the rotational moment is eliminated to and impedes the rotation of the tray 12. Accordingly, inconveniences such as yarn breakages produced during carrying of the two-stage type yarn feed package 5 is overcome. Furthermore, in the curve portion 13B of the tray conveying device 13, the direction of the tray 12 is changed to the advancing direction before the first roller 18 moves from the straight line portion 13A to the curve portion 13B by the second roller 20 and the guide member 21. Therefore, the shock applied to the first roller 18 is relieved so that the tray 12 can be smoothly moved along the curve portion.

While in this embodiment, two rollers 18 and 20 are mounted on the tray 12, it is to be noted that a third roller 22 with the end edge 17b of the other upper flange 17 as a guide may be provided at a position of point symmetrical with the first roller 18 with respect to the center C of the tray 12 as indicated by the phantom line in FIG. 2. According to this, both the first and third rollers 18 and 22 impede the rotation of the tray 12, and the tray 12 is urged toward the central portion widthwise of the tray conveyor 13 so that the end of the tray 12 does not contact with the side wall of the guide groove 14 to secure smooth movement of the tray 12. Furthermore, while in the embodiment the two-stage type yarn feed package has been carried, it is to be noted that a conventional package can be course be used.

As described above, in short, according to the present invention, it is possible to impede the rotation of the tray being carried whereby inconveniences such as yarn breakages produced during carrying of the two-stage type yarn feed package can be overcome.

What is claimed is:

1. An apparatus, comprising:
a conveyor having first and second guide grooves and a drive belt, at least one of the first and second guide grooves including a support surface;
a tray for holding a yarn-feed package, the tray being conveyed between the guide grooves and having a center, a bottom surface and an upper surface, a portion of the bottom surface of the tray contacting the support surface of the at least one guide groove; and
an antirotation device mounted on the upper surface of the tray comprising at least a first roller, the first roller engaging and being guided by an upper edge of the first guide groove, and the first roller being located at a position offset from the center of the tray,
wherein the antirotation device prevents rotation of the tray along the entire length of the conveyor.

2. An apparatus as in claim 1, including an upper flange formed at the upper edge of the first guide groove to prevent the tray from being tipped over.

3. An apparatus as in claim 2, wherein the upper flange includes an end edge, and wherein a distance from the center of the tray to an outer circumferential surface of the first roller is greater than a distance from the center of the tray to the end edge of the upper flange.

4. An apparatus as claim 3, further comprising:
(a) a second roller which is guided by the end edge of the upper flange, the second roller being provided on the tray at a position offset from the center of the tray and ahead of the first roller in a conveying direction.

5. An apparatus as in claim 4, wherein the first guide groove includes a second upper flange having an inner wall surface opposingly arranged with the end edge of the first upper flange, and wherein the first and the second rollers are movably disposed between the first and second upper flanges.

6. An apparatus as in claim 5, further comprising a third roller, wherein the second guide groove includes an upper flange, the third roller being guided by an end edge of the upper flange of the second guide groove, and the third roller being located at a position symmetrical with the first roller with respect to the center of the tray.

7. An apparatus, comprising:
a disk-shaped tray for carrying a yarn feed package, the disk-shaped tray having an upper surface and a lower surface,
a guide groove for guiding the disk-shaped tray, the guide groove including a support surface for supporting a portion of the bottom surface of the disk-shaped tray, and an upper edge surface,
a drive belt for driving the disk-shaped tray along the guide groove, and
antirotation means for preventing the disk-shaped tray from rotating as it is driven along the guide groove, the antirotation means including at least a first roller disposed on the upper surface of the disk-shaped tray and movably abutting the upper edge surface of the guide groove.

8. An apparatus according to claim 7, wherein the guide groove includes a first upper flange having an outer end surface which movably abuts the first roller, the first upper flange being formed at the upper edge of the guide groove to prevent the disk-shaped tray from falling over as it is being driven by the drive belt.

9. An apparatus according to claim 8, wherein a distance from a center of the disk-shaped tray to an outer edge of the first roller is larger than a distance from the center of the disk-shaped tray to the outer edge surface of the first upper flange.

10. An apparatus according to claim 9, wherein the antirotation means includes a second roller disposed on the upper surface of the disk-shaped tray, the second roller movably abutting the outer edge surface of the first upper flange.

11. An apparatus according to claim 10, wherein the guide groove includes a second upper flange having an inner wall surface opposingly arranged with the outer end surface of the first upper flange, wherein the first and the second rollers are movably disposed between the first and second upper flanges.

12. An apparatus according to claim 10, wherein the guide groove includes a pair of first and second opposingly arranged guide members each having a respective upper edge surface, the disk-shaped tray being movably retained by the pair of opposingly arranged guide members with the first and second rollers movably abutting the first guide member, and wherein the antirotation means includes a third roller movably abutting the upper edge surface of the second guide member.

* * * * *